United States Patent [19]

Carter et al.

[11] 3,737,870

[45] June 5, 1973

[54] STATUS SWITCHING ARRANGEMENT

[75] Inventors: William C. Carter, Ridgefield, Conn.; Edward P. Hsieh, Yorktown Heights; Aspi B. Wadia, Chappaqua, both of N.Y.

[73] Assignee: International Business Machines Corporation, Armonk, N.Y.

[22] Filed: Apr. 24, 1972

[21] Appl. No.: 246,733

[52] U.S. Cl. .......... 340/172.5

[51] Int. Cl. .......... G06f 11/00, G06f 13/06

[58] Field of Search .......... 340/172.5

[56] References Cited

UNITED STATES PATENTS

| | | | |
|---|---|---|---|
| 3,302,182 | 1/1967 | Lynch et al. | 340/172.5 |
| 3,386,082 | 5/1968 | Stafford et al. | 340/172.5 |
| 3,419,849 | 12/1968 | Anderson et al. | 340/172.5 |
| 3,517,171 | 6/1970 | Avizienis | 340/172.5 |
| 3,581,286 | 5/1971 | Beausoleil | 340/172.5 |
| 3,641,505 | 2/1972 | Artz et al. | 340/172.5 |
| 3,665,418 | 5/1972 | Bouricius | 340/172.5 |
| 3,570,008 | 3/1971 | Downing et al. | 340/172.5 |

*Primary Examiner*—Paul J. Henon
*Assistant Examiner*—Jan E. Rhoads
*Attorney*—Isidore Match, Murray Nanes and J. Jancin, Jr.

[57] ABSTRACT

There is disclosed a switching arrangement for effecting storage module reconfiguration in a data processing system wherein the memory comprises a quantity *q* of operating n-bit/BSM's (basic storage modules) and a quantity *s* of spare n-bit/BSM's. The arrangement comprises an input status register means which in turn comprises an input status register associated with each of the BSM's respectively, which control an input reconfiguration network, and an output status register means which comprises an output status register respectively associated with each of the BSM's, which control an output reconfiguration network. The input and output status registers and the input and output reconfiguration networks are of like structures, respectively. Initially, in normal operation, the operating BSM's are connected to respective bit positions and all of the input and output status registers assume a chosen initial state. Initially, upon the ascertaining from a diagnosis, for example, that one of the operating BSM's has failed, the input status register with which the failed BSM is associated is forced to a parity state opposite from the normal operating parity state, and all of the input status registers succedding in designated numerical value are switched to a next state. This causes the failed BSM to be disconnected from the input; the input originally connected to the failed BSM is connected to the BSM of succeeding higher value, the next higher input connected to the next BSM and so on until the last input is connected to the first pare BSM. At this point, all of the contents of the memory, i.e., the initially operating BSM's, are passed through the output reconfiguration network under the control of the output status registers (which is not yet altered) and through a correction circuit wherein there is provided means for applying an error correction code. The memory contents are then passed from the correction circuit back into the present operating BSM's through the input reconfiguration network under the control of the input status registers. Thereafter, the contents of the output status registers are then brought into conformity with the present contents of the input status registers whereupon normal operation can resume. The arrangement permits as many changes in the contents, i.e., states of the status registers after their initial states as there are spare BSMM's in the memory organization, the contents of status registers of operating BSM's which succeed a failed BSM being switched to a next state. Suitably, an operating parity state of a status register is of even parity and, when its associated BSM fails, its state is forced to an odd parity. An algorithm is presented for diagnosing as a failed BSM which is based upon the criterion of the ascertaining of a bit position which has undergone corrections most frequently over a chosen period of time. The switching arrangement also contemplates a basic storage module reconfiguration in the case of a status register failure in which situation, similar events ensue in the arrangements operation as would have occurred has a BSM failed.

9 Claims, 19 Drawing Figures

United States Patent [19]
Carter et al.
[11] 3,737,870
[45] June 5, 1973
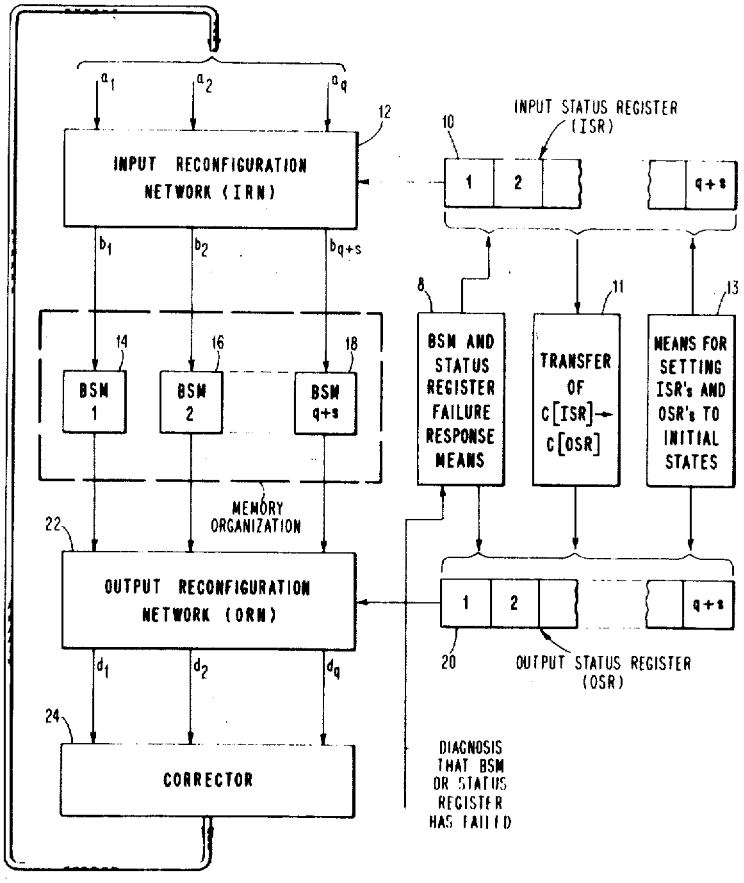

STATUS SWITCHING ARRANGEMENT

BACKGROUND OF THE INVENTION

This invention relates to switching arrangements for effecting storage module reconfiguration in a data processing system. More particularly, it relates to a novel status switching arrangement which is efficient in the amount of circuitry employed and which enables great flexibility in the toleration of status register and basic storage module failures.

Heretofore, wherein a memory organization has been utilized in a data processing system which comprises operating and spare BSM's (Basic Storage Modules), storage module reconfiguration, i.e., the replacement of a failed operating BSM by a spare BSM, has been effected by employing triple-modular redundancy (TMR) in switching status registers. However, triple modular redundancy presents the disadvantage in that it requires an undesirable increase in the amount of necessary circuitry.

Accordingly, it is an important object of this invention to provide an arrangement for achieving storage module reconfiguration wherein triple-modular redundancy is not employed.

It is another object of the invention to provide an algorithm for determining the existence of a failed BSM or failed status register to cause its being switched out of operation of prefailed BSM or the BSM associated with the failed status register and the switching in of a spare BSM.

It is a further object of this invention to provide an arrangement for effecting storage modules reconfiguration whereby a memory organization, which has a quantity $s$ of spare BSM's, can tolerate the total quantity of $s$ status register and BSM failures.

SUMMARY OF THE INVENTION

Generally speaking and in accordance with the invention, there is provided a switching arrangement for effecting basic storage module reconfiguration in a data processing system memory organization which comprises the quantity q of operating n-bit BSM's and a quantity s of spare n-bit BSM's. The arrangement comprises like input status register and output status register means, each of these register means comprising a quantity $q+s$ of status registers, each of the input status registers being associated with a corresponding BSM which specifies the connections through an input reconfiguration network. Each of the output status registers are also associated with a corresponding BSM, which specifies the connections through an output reconfiguration network. The operating BSMs are connected to respective bit positions through the input and output reconfiguration networks. The status registers are adapted to be switched successively to $s+1$ predetermined states, each of these states having a chosen parity, the status registers also being adapted to be placed into a state opposite to the chosen parity when its associated BSM fails. Initially, the $q$ quantity of operating BSM's are connected to the input and output of the storage organization through the input and output reconfiguration networks. There are provided responsive to the diagnosing or ascertaining of a failed operating BSM, means for forcing the input status register associated with the latter failed BSM to the opposite parity state and means for switching the states of the input status registers of the operating BSM's succeeding the input status register of the failed BSM to the next one of the successive states, means for switching out the failed BSM, means for switching the input originally connected to the failed BSM to the BSM of succeeding higher value, the next higher input connected to the next BSM and so on until the last input is connected to the first spare BSM. Means are also provided for reading the contents of all of said BSM's through the output reconfiguration network under the control of the output status registers (which is still in its old state) and applying these contents through an error-correcting means and writing into the BSM's through the input reconfiguration network under the control of the input status registers. There is further included means for then conforming the contents of the output status registers with the contents of the input status registers, whereby normal operation now resumes with the operating BSM's comprising the initial operating BSM's less the failed BSM plus the spare BSM. Thereafter, as an operating BSM fails the next spare BSM is switched in as was the first spare BSM. Operation proceeds until all the spare BSM's have been switched into operation. The operation can proceed until the quantity of failed BSM's attain the value $s+1$.

In accordance with the invention, a failure of a status register, i.e., one associated with a non-failed BSM which assumes a parity state opposite to the proper operating parity state, activates the means for switching out the BSM associated therewith and effects the reconfiguration of the BSM organization as if the BSM had failed.

Also, in accordance with the invention, a method is provided for reconfiguring the BSM memory organization upon the ascertaining that an operating BSM or status register has failed.

The foregoing and other objects, features and advantages of the invention will be apparent from the more particular description of preferred embodiments of the invention, as illustrated in the accompanying drawings.

DESCRIPTION OF A PREFERRED EMBODIMENT

In considering the invention, data words are stored in basic storage modules (BSM's) using known error correcting codes. For example, in an n-bit/BSM memory organization, there may be employed a single n-adjacent bit group correcting code such as described in the paper of P. C. Bossen, "b-Adjacent Error Correction", IBM Journal of Research and Development, July 1970. Upon the determination of which BSM or status register has failed, the reconfiguration of the BSM's is effected in accordance with the invention as shown in FIG. 1A.

Figure 1A:
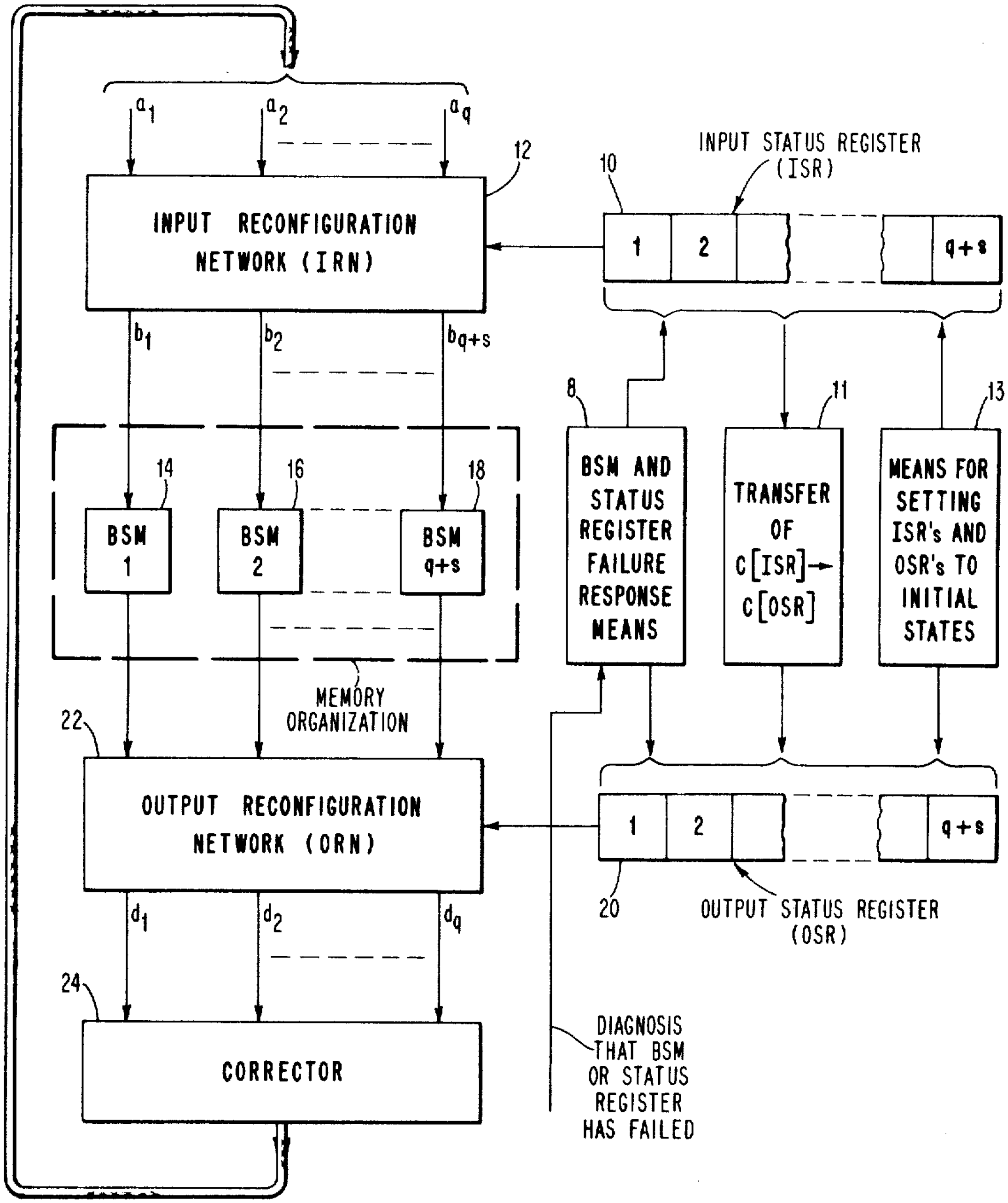
FIG. 1A is a block diagram of a preferred embodiment constructed in accordance with the principles of the invention.

Referring now to FIG. 1A, upon the ascertaining that a BSM or a status register has failed, the BSM and status register failure response means 8 is utilized to effect the reconfiguration. Thus, if it is a BSM that has failed, means are utilized to determine what has to be loaded into the input status register (ISR) 10 depending on the current contents of the input status register and the position of the failed BSM. After ISR 10 has been so loaded, the contents of the BSM's in the memory organization shown in FIG. 1A as BSM's 14, 16 and 18 are applied to a corrector 24 through an output reconfiguration network (ORN) 22, the corrector suitably being circuitry for affecting error correction. BSM's 14, 16 and 18 are connected through ORN 22 to the bit positions $d_1$, $d_2$ to $d_q$, being assumed in the embodiment in FIG. 1A that there are $q$ bit positions. The corrected bits from corrector 24 are not passed through the input reconfiguration network (IRN) 12 to the BSM's 14, 16 and 18. It is seen that bit positions $a_1$ and $a_2$ to $a_q$ which correspond to bit position $d_1$, $d_2$ and $d_q$ are connected to the correspondingly numerically designated BSM through IRN 12. Lines $b_1$, $b_2$ and $b_q + s$ indicate lines connecting the outputs of IRN 12 to the BSM's.

With the memory now completely refurbished with the corrected data, by stage 11, the contents of ISR are transferred to the contents of the output status register (OSR). , i.e., the contents of OSR are conformed with the contents of ISR. It is noted that BSM 18 and the rightmost portions of ISR 10 and OSR 20 are designated as $q + s$. As will be explained further hereinbelow, $q$ is the quantity of operating BSM's and s is the quantity of spare BSM's. The stage 13; i.e., the means for setting the input status register (IRS's) and the output status registers (OSR's) to the initial states is included in the arrangement shown in FIG. 1A to indicate that all the status registers are initially set to particular settings as will be further explained hereinbelow.

When BSM failure and status register response means 8 is actuated by the ascertaining of a BSM failure and the contents of ISR 10 are changed in response thereto, the BSM is switched out and the appropriate available spare BSM is switched in as an operating BSM. Thus, when the corrected information from corrector 24 is re-entered into the BSM's through IRN 12, the information in the memory at that point is correct. Thereafter, upon the transferring of the contents of ISR 10 to OSR 20, normal operation of the system can resume.

In the situation where a status register fails BSM and status register failure response means 8 is operative to cause necessary actions of setting status register and refurbishing the content of memory as required.

Figure 1B:
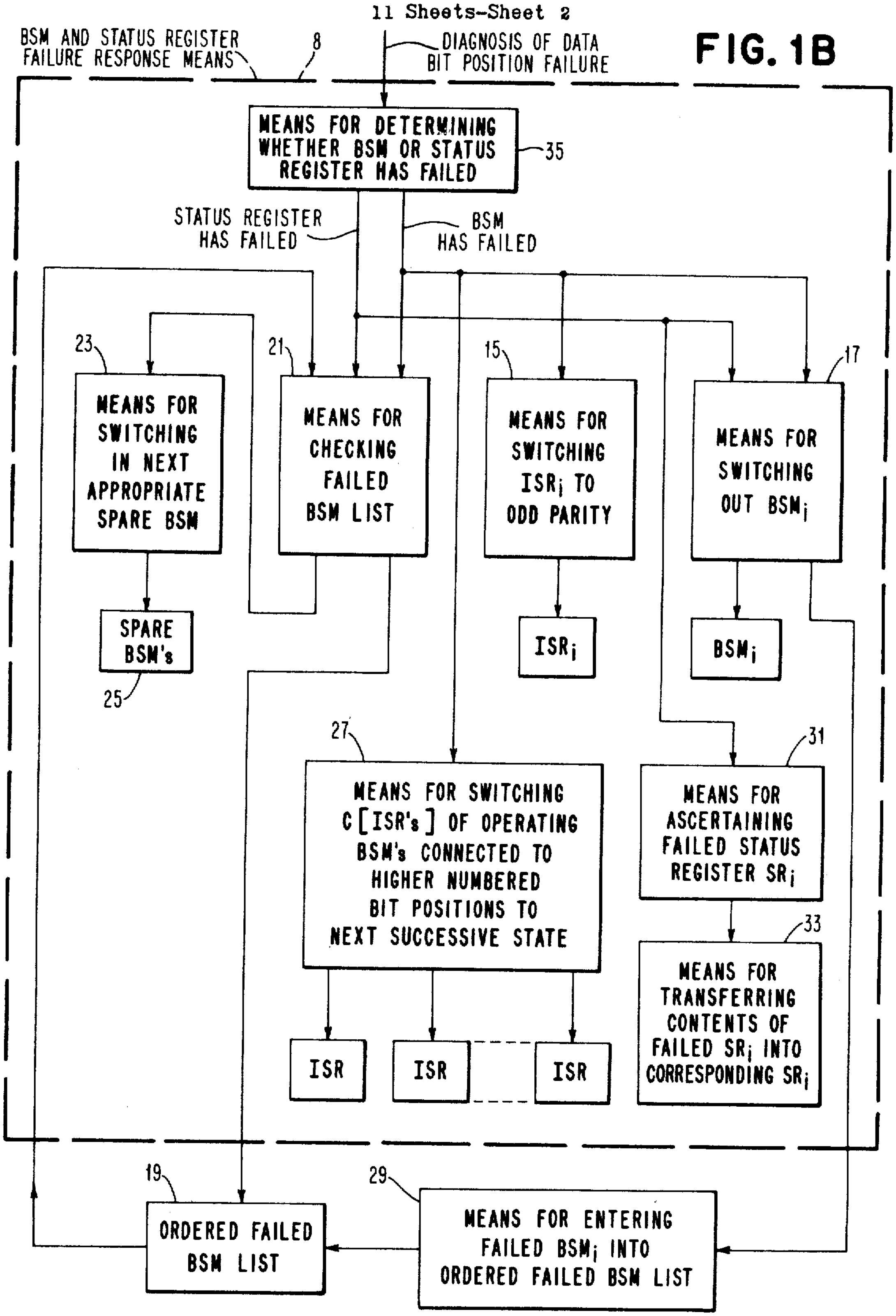
FIG. 1B is a detailed diagram of the BSM failure response means shown in FIG. 1A.

Reference is now made to FIG. 1B wherein there is shown a detailed embodiment of BSM and status register failure response means 8. In the operation of the arrangement shown in FIG. 1B determination of whether a BSM or status register has failed is done by stage 35. Upon the determination that a $BSM_i$ had failed, the status register associated with the failed $BSM_i$ is switched to an odd parity state, it being assumed that even parity is the proper parity state for operation, such switching being accomplished by means for switching $ISR_i$ to odd parity stage 15. The fail $BSM_i$ is switched out by the means for switching out $BSM_i$ 17. An ordered failed BSM list 19 is maintained. When the failure of the BSM is ascertained, the ordered fail BSM list 19 is caused to be checked by the means for checking the fail BSM list stage 21. In response to such check, means 21 ascertains which BSM is to be switched out. Thereby, by the means for switching in the next appropriate spare BSM stage 23, the appropriate spare BSM is switched into operation. By stage 27, the contents of the input status registers constituting ISR 10 are now switched to the proper states for normal operation. The spare, switched in by stage 23, now functioning as an operating BSM. Thereafter, referring back to FIG. 1A, the contents of the BSM's in the memory organization are read into the corrector 24 through ORN 22 under the control of OSR 20 and the BSM's then have the corrected information re-entered thereinto through IRN 12 under the control of ISR 10. Thereafter, the contents of OSR 20 are conformed with the contents of ISR 10 and normal operation resumes. The means for entering failed $BSM_i$ into the ordered failed BSM list 29 operates in response to the switching out of the fail $BSM_i$. Thereby, ordered failed BSM list 19 is maintained up-to-date.

Upon the determination that a status register has failed, then the stage 31 is operative to ascertain which status register has failed. By stage 33, both the failed status register and the contents of the status register corresponding to the failed status register are forced to an odd parity state. By corresponding status registers, there is meant the input and output status registers associated with the same BSM. Otherwise, the same events ensue in the operation of the BSM failure response means as take place when a BSM failure is diagnosed.

In the carrying out of the invention, it is assumed that there exists a decision strategy whereby there is decided within a chosen period of operation as to which of the data bit groups has been corrected most often.

In the embodiment disclosed herein, the switching network for a bit/BSM memory organization with three spare BSM's is described. It is to be understood that extension to multiple bit/BSM memory organization with any number of spares is readily accomplished within the contemplation of and according to the principles of the invention.

In considering the switching of the BSM's, it is to be realized that for a memory organization with $q$ operating BSM's and $s$ spare BSM's, there are required $q+s$ registers for both the ISR and the OSR. Each of the registers has the length $\lfloor 1+ \log_2(s+1) \rfloor$ bits. Thus, where three spares are used, a register has a length of three. The OSR 20 comprises registers $OSR_1$, $OSR_2$, . . . , $OSR_{q+s}$ and the ISR 14 comprises registers $ISR_1$, $ISR_2$, . . . , $ISR_{q+s}$. Each register combination $OSR_i$ ($ISR_i$) is associated with $BSM_i$ and the contents of these registers specify the connection between $BSM_i$ and the data bit positions as is further explained hereinbelow.

Figure 2:
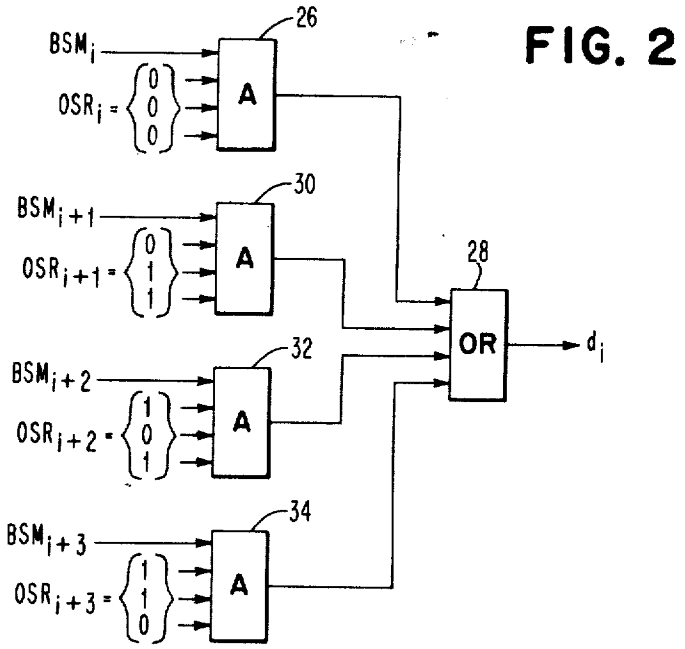
FIG. 2 is a conceptual depiction of the output reconfiguration network means.
Figure 3A:
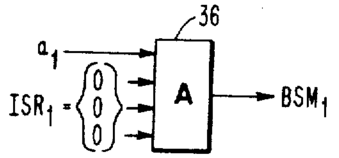
FIGS. 3A–3G is a conceptual depiction of the input reconfiguration network.
Figure 3B:
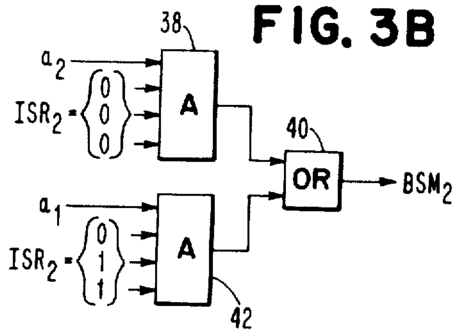

In FIG. 2, there is shown the output reconfiguration network (ORN) 22 that defines the BSM-to-bit mapping of the switches in the ORN under the control of the OSR and FIGS. 3A to 3B collectively show the input reconfiguration network that defines the bit-to-BSM mapping of the switches in the IRN under the control of the ISR for the particular case of $s=3$. In FIG. 2, it is seen that AND circuit 26 is enabled to connect $BSM_i$ to bit position $d_i$ through OR circuit 28 if and only if the setting in the output status register $OSR_i$ = 000. The AND circuit 30 is enabled to connect the $BSM_{i+1}$ to bit position $d_i$ through OR circuit 28 if and only if the setting in the output status register $OSR_{i+i}$ = 011. The AND circuit 32 is enabled to connect the $BSM_{i+2}$ to bit position $d_i$ only if the selling in the output status register $OSR_{i+2}$ = 101. The AND circuit 34 is enabled to connect the $BSM_{i+3}$ to bit position $d_i$ through OR circuit 28 only if the setting in the output status register $OSR_{i+3}$ = 110. In FIG. 2, the following value obtains, i.e., $1 \leq i \leq q$. The arrangement in FIG. 2 shows that for any output status register $OSR_i$ containing an odd parity state, a $BSM_i$ is not connected to any of the data positions, $d_i$'s.

Figure 3C:
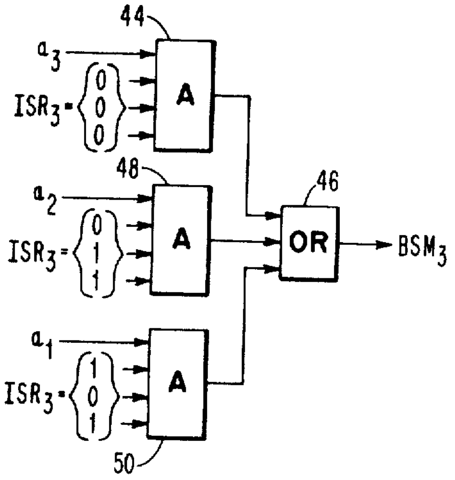
Figure 3D:
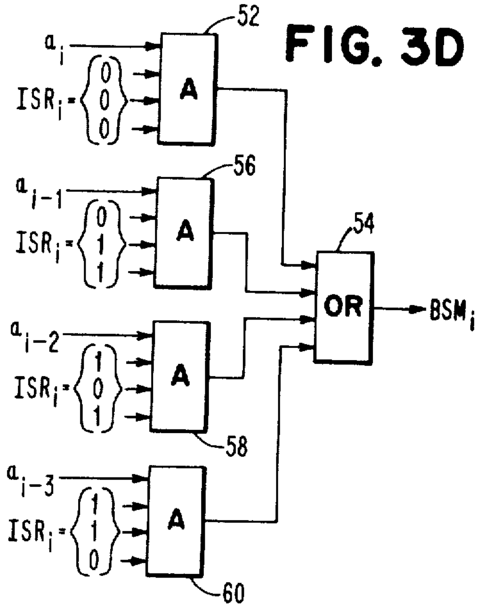

In a similar manner, as shown in FIGS. 3A to 3G where an $IRS_i$ contains an odd parity, a $BSM_i$ is not connected to any bit $a_i$. Thus, in FIG. 3A, bit $a_1$ is connected to $BSM_1$ through AND circuit 36 only if the setting in $ISR_1$ is 000. In FIG. 3B, the AND circuit 38 is enabled to connect bit $a_2$ to $BSM_2$ through the OR circuit 40 only if the setting in $ISR_2$=000. The AND circuit 42 is enabled to connect the bit position $a_1$ to $BSM_2$ through OR circuit 40 only if the setting in $ISR_2$ is 011. In FIG. 3C, the AND circuits 44, 48 and 50 are enabled to connect positions $a_3$, $a_2$, and $a_1$ to $BSM_3$ through the OR circuit 46 only if the respective settings in $ISR_3$ are 000, 011 and 101, respectively. In FIG. 3D, it is seen that the AND circuits 52, 56, 58 and 60 are enabled to connect bit positions $a_i$, $a_{i-1}$, $a_{i-2}$, and $a_{i-3}$ to $BSM_i$ through OR circuit 54 only if the respective settings in the $ISR_i$ are 000, 011, 101 and 110.

Figure 3E:
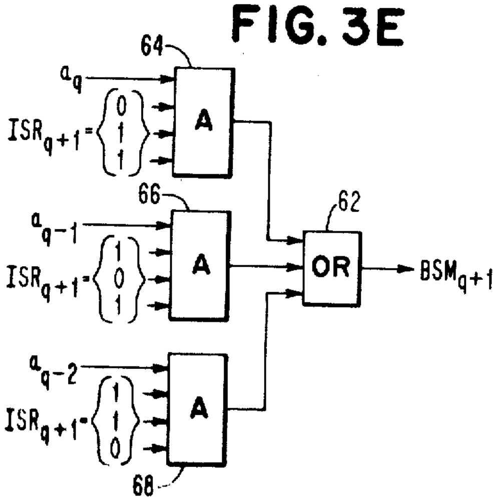
Figure 3F:
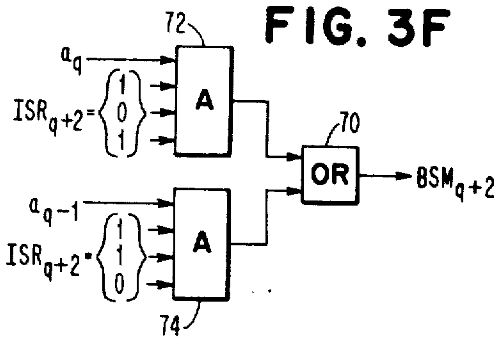
Figure 3G:
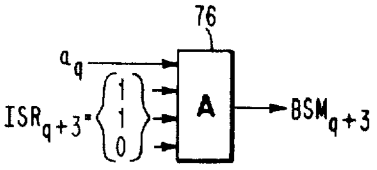

In FIG. 3D, the following values obtains, i.e., $4 \leq i \leq q$. FIG. 3E shows the situation where bits $a_q$, $a_{q-1}$ and $a_{q-2}$ are connected to $BSM_{q+1}$ through OR circuit 62 when AND circuits 64, 66, and 68 are respectively enabled by the settings in $ISR_{q+1}$ of 011, 101, and 110. FIG. 3F illustrates the situation where bits $a_q$ and $a_{q-1}$ are connected to $BSM_{q+2}$ through OR circuit 70 when the AND circuits 72 and 74 are respectively enabled by the setting in $ISR_{q+2}$ of 101 and 110, respectively. FIG. 3G shows the connecting of bit $a_q$ to $BSM_{q+3}$ by the enabling of AND circuit 76 by the setting in $ISR_{q+3}$ or 110.

Initially, the input and output status registers of the operating BSM's contain all 0's whereby operating $BSM_i$ is connected to bit position $d_i$ in the read cycle and bit position $a_i$ is connected to $BSM_i$ in the write cycle. An ordered list L of failed BSM's is suitably maintained as shown in FIG. 1B.

In the embodiment illustrative of the invention, the state of each register in ISR or OSR has to follow the following state sequence during a switching operation in which the BSM associated with the register is not to be switched off:

$$000 \rightarrow 011 \rightarrow 101 \rightarrow 110$$

The contents of ISR(OSR) in order to switch off the BSM are controlled as follows when a failed $BSM_i$ is detected.

Figure 4:
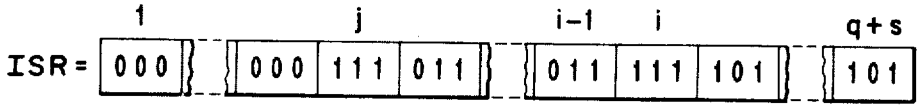
FIG. 4 depicts the settings in the input status register means at a particular point in the operation of the invention.
Figure 5:
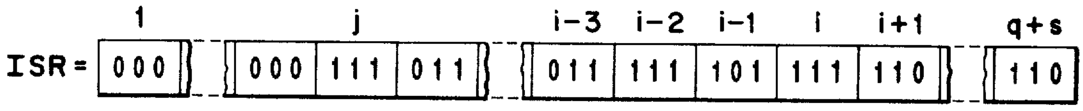
FIG. 5 shows the settings in the input status register means at another point in the operation of the invention.

The $ISR_i(OSR_i)$ associated with $BSM_i$ is forced to an odd parity state. All $ISR_k(OSR_k)$ with $k>i$ and $k$ not in the failed BSM list L are changed to the next state. For example, if the status of the registers of ISR are as shown in FIG. 4 and $BSM_{i-2}$ has to be switched off, then the new ISR contents should be as shown in FIG. 5.

This changes the bit-to-BSM mapping from $d_1 \rightarrow BSM_1$
.
.
.
$d_{j-1} \rightarrow BSM_{j-1}$
[$BSM_j$ switched out
$d_j \rightarrow BSM_{j+1}$
$d_{j+1} \rightarrow BSM_{j+2}$
.
.
.
$d_{i-2} \rightarrow BSM_{i+1}$
[$BSM_i$ switched out
$d_{i-1} \rightarrow BSM_{i+1}$
$d_i \rightarrow BSM_{i+2}$
.
.
.
$d_q \rightarrow BSM_{q+2}$
[$BSM_{q+3}$ not yet connected to $d_1 \rightarrow BSM_1$
.
.
.
$d_{j-1} \rightarrow BSM_{j-1}$
[$BSM_j$ switched off
$d_j \rightarrow BSM_{j+1}$
$d_{j+1} \rightarrow BSM_{j+2}$
.
.
.
$d_{i-4} \rightarrow BSM_{i-3}$
[$BSM_{i-2}$ switched off
$d_{i-3} \rightarrow BSM_{i-1}$
[$BSM_i$ switched off
$d_{i-2} \rightarrow BSM_{i+1}$
.
.
.
$d_q \rightarrow BSM_{q+3}$ and $BSM_{i-2}$ is thus switched off.

In the foregoing, it has been assumed that the BSM to be switched off was given. However, in actual operation, the only information which may be available is which of the data positions $d_k$ has undergone correction most frequently over a fixed period of time. The algorithm set forth herein below determines which BSM has to be switched off for a particular $d_k$.

A. Determination of the BSM to be switched out when the decision strategy has determined that $d_k$ has been corrected most often and determination of the new contents of ISR.

Let $L = i_1, i_2, \ldots, i_L$ where $i_i = 0$ $i_L = q+s+1$ and $i_2, i_3, \ldots, i_{L-1}$ is an ordered list of the failed BSM's. Initially $L = o, q+s+1$.

At first, compare $k$ with the elements of $L$. If $i_l \leq k < i_{l-1}$ and $j$ is the smallest integer greater than or equal to $(k+l-1)$, then $BSM_j$ was connected to $d_k$ and, consequently, it was the cause of error and has to be switched off.

With the determination as to which BSM is to be switched off, i.e., $BSM_j$, the contents of OSR remain unchanged while the contents of ISR are updated as follows. An odd parity state is forced into $ISR_j$ and $ISR_p$ is changed to the next state, wherein $p<j$ and $p$ is not in $L$. Then, $j$ is placed into list $L$ and the list is reordered.

B. Refurbishing of the Memory

The memory is refurbished by the reading out of all of the words of the memory under the control of OSR through the corrector and writing them back into the BSM's under the control of the new ISR. The contents of ISR are transferred to OSR and operation is resumed.

C. Switching of BSM's in the presence of status register failures

Let is be assumed that a single failure occurs in the register $OSR_i(ISR_i)$. Such failure may be one which either does not change the parity, in which case no erroneous switching occurs, or it changes the parity. If it changes the parity it either (1) switches in a switched-off BSM thereby connecting two BSM's to single data bit positions or (2) it switches off an active BSM, thereby not connecting any BSM to one of the data bit positions. In both cases, exactly one of the data bit positions $d_k$ will be most frequently in error. The following algorithm distinguishes these two cases and determines the correct next state for the status registers to effect correct reconfiguration.

D. Determination of the next state for status registers when $d_k$ is most often in error as a result of a BSM failure or a status register failure The contents of ISR are compared with the contents of OSR.

1. If OSR=ISR, then the error in $d_k$ is the result of a BSM failure. Accordingly, the procedure followed is as set forth in A and B hereinabove.

2. If the respective contents of ISR and OSR are not equal, then there exists an $i$ such that the contents of $OSR_i$ and $ISR_i$ are not equal. The error in $d_k$ is thus the result of a status register failure.

a. If $i$ is not an element of $L$ and $ISR_i$ has oddparity, then $ISR_i$ contains a failure. Accordingly, $ISR_j$ is changed for all $j>i$ to the next state except those j's with $j \in L$. The memory is then refurbished as described in section B herein above. To list $L$ there is added $i$ and $L$ is reordered.

b. If $i \notin L$ and $ISR_i$ has even parity, then $OSR_i$ contains a failure. In this case the contents of $OSR_i$ are forced into $ISR_i$ and $ISR_j$ for all $j>i$ are changed to the next state except those $j$'s with $j \in L$. The memory is then refurbished as described in section B herein above. To list $L$, $i$ is added and then $L$ is reordered.

c. If $i \in L$ and $ISR_i$ has odd parity, then $OSR_i$ contains a failure. By comparing the contents of $OSR_i$ and $ISR_i$, there is determined which bit of $OSR_i$ fails.

Let it be assumed that bit $j$ of $ISR_i$ fails. Then

1. If $OSR_i[j] = 1$, $ISR_i[j]$ is set equal to 1 and $ISR_i[k]$ is set to = 0 for all $k \neq j$.

2. If $OSR_i[j] = 0$ $ISR_i[k_1]$ is set equal to 1 with $k_1 \neq j$ and $ISR[k]$ is set equal to 0 with $k \neq k_1$. Transfer the contents of ISR to OSR. This will ensure that an oddparity state can be forced into $OSR_i$ when $ISR_i$ is transferred into $OSR_1$. In this case, operation is resumed and no refurbishing of the memory is required.

d. $i \in L$ and $ISR_i$ has even parity. This is an impossible situation since in this case only a previously switched off BSM is being written into and not being read from. Consequently, none of the data bit positions is in error.

From the foregoing, it is apparent that the system can tolerate in the worst case, a total number of BSM and status register failures equal to the number of spares. This is because, in the worst case, a status register failure appears as a BSM failure and the subsequent switching off of the BSM associated with that status register switches off the status register containing the failure. Since the status register controls the entire switching network, the capability of tolerating status register failures greatly enhances the reliability of storage module reconfiguration.

Figures 6, 6A:
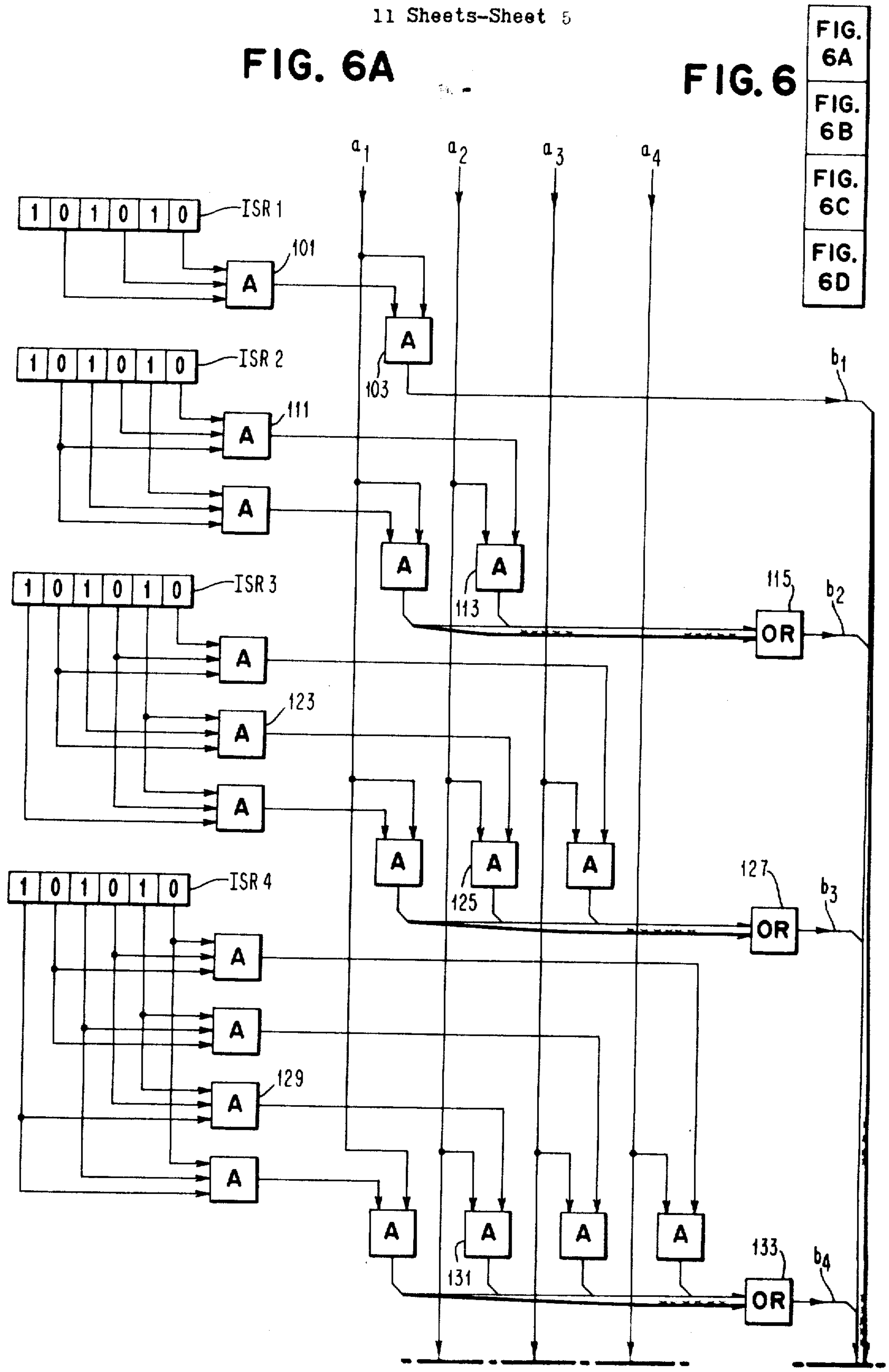
FIGS. 6A–6D taken together as in FIG. 6 constitute a diagram of a preferred embodiment of the status switching arrangement constructed in accordance with the principles of the invention.
Figure 6B:
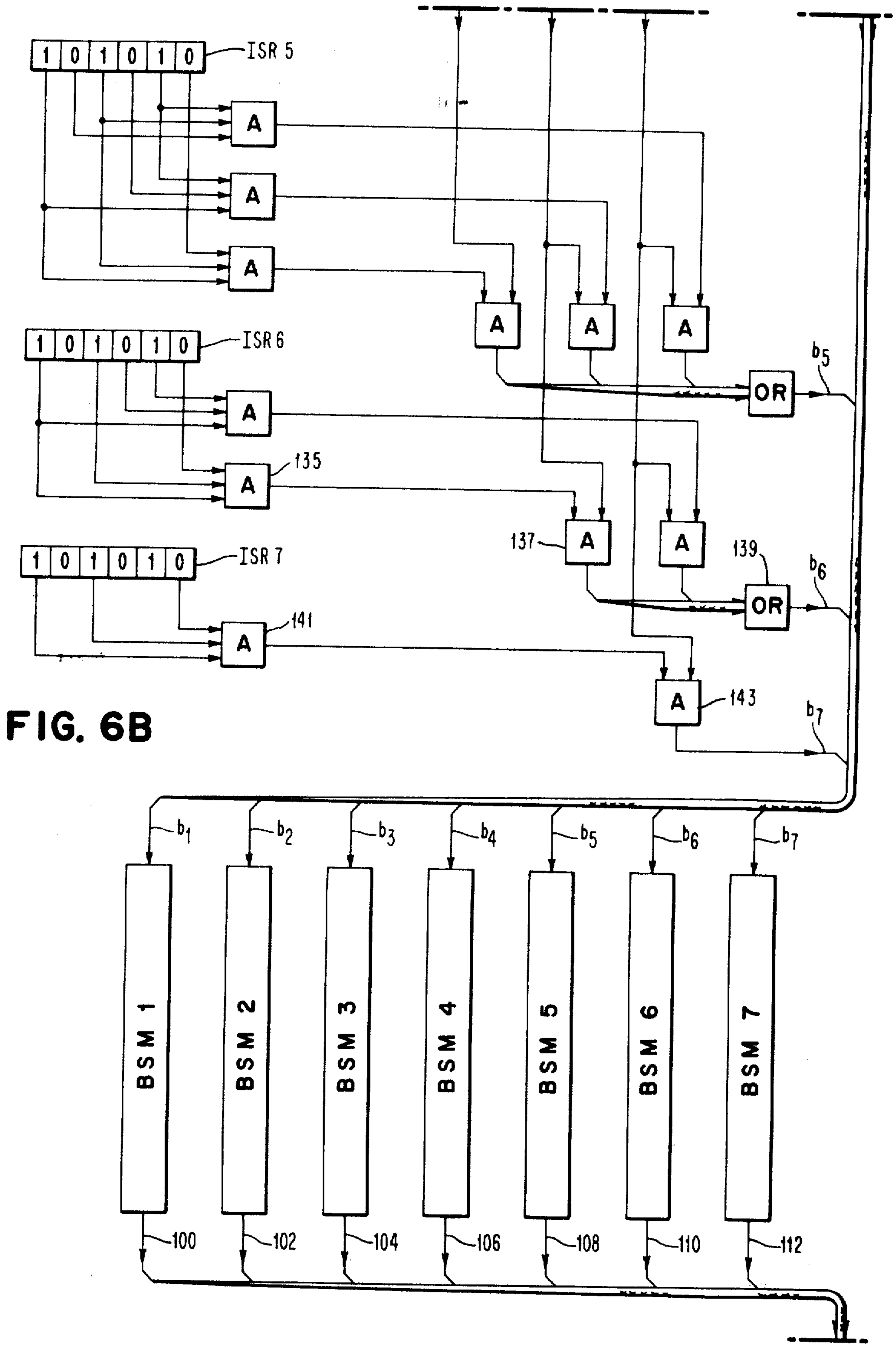
Figure 6C:
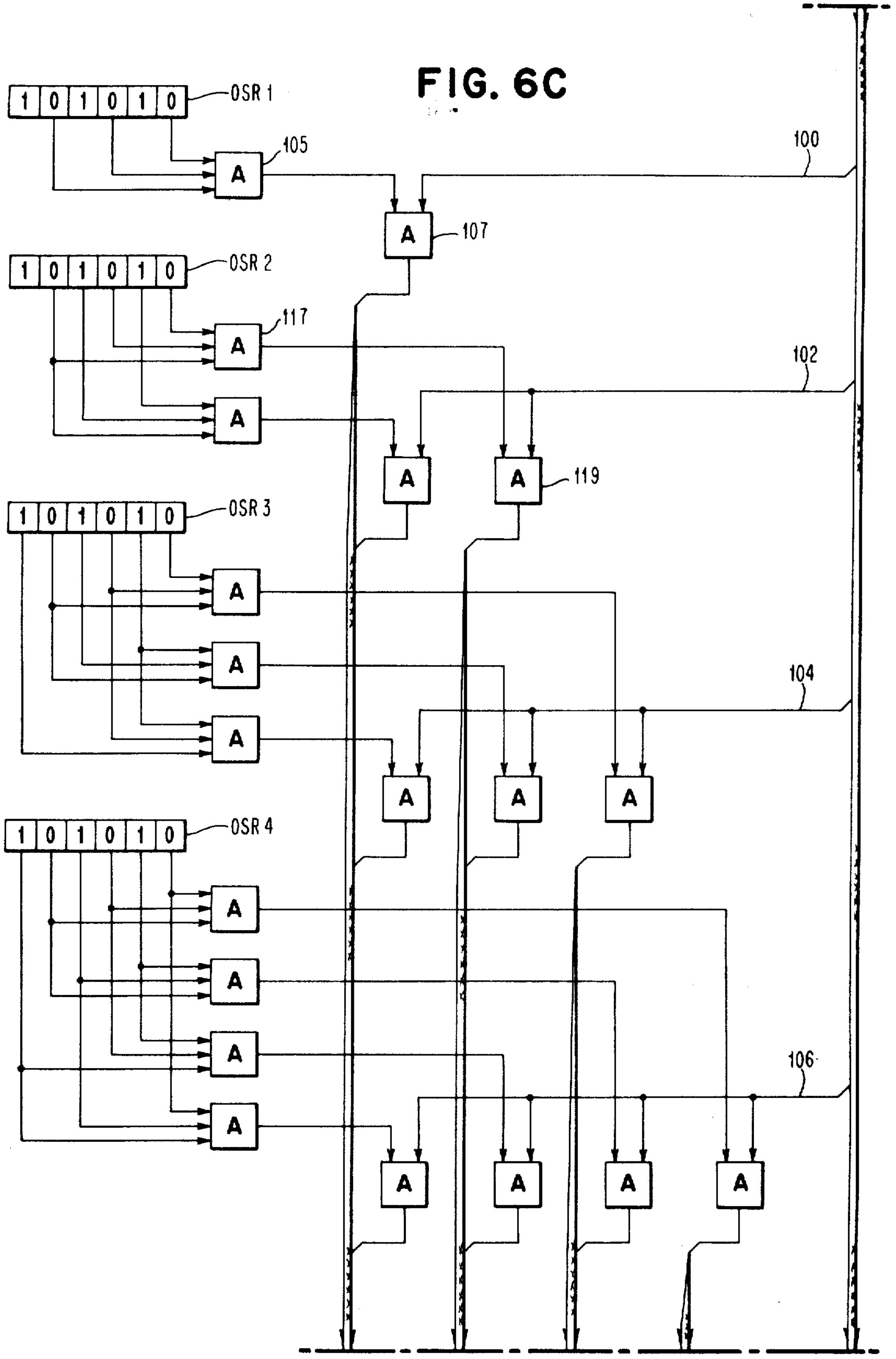
Figure 6D:
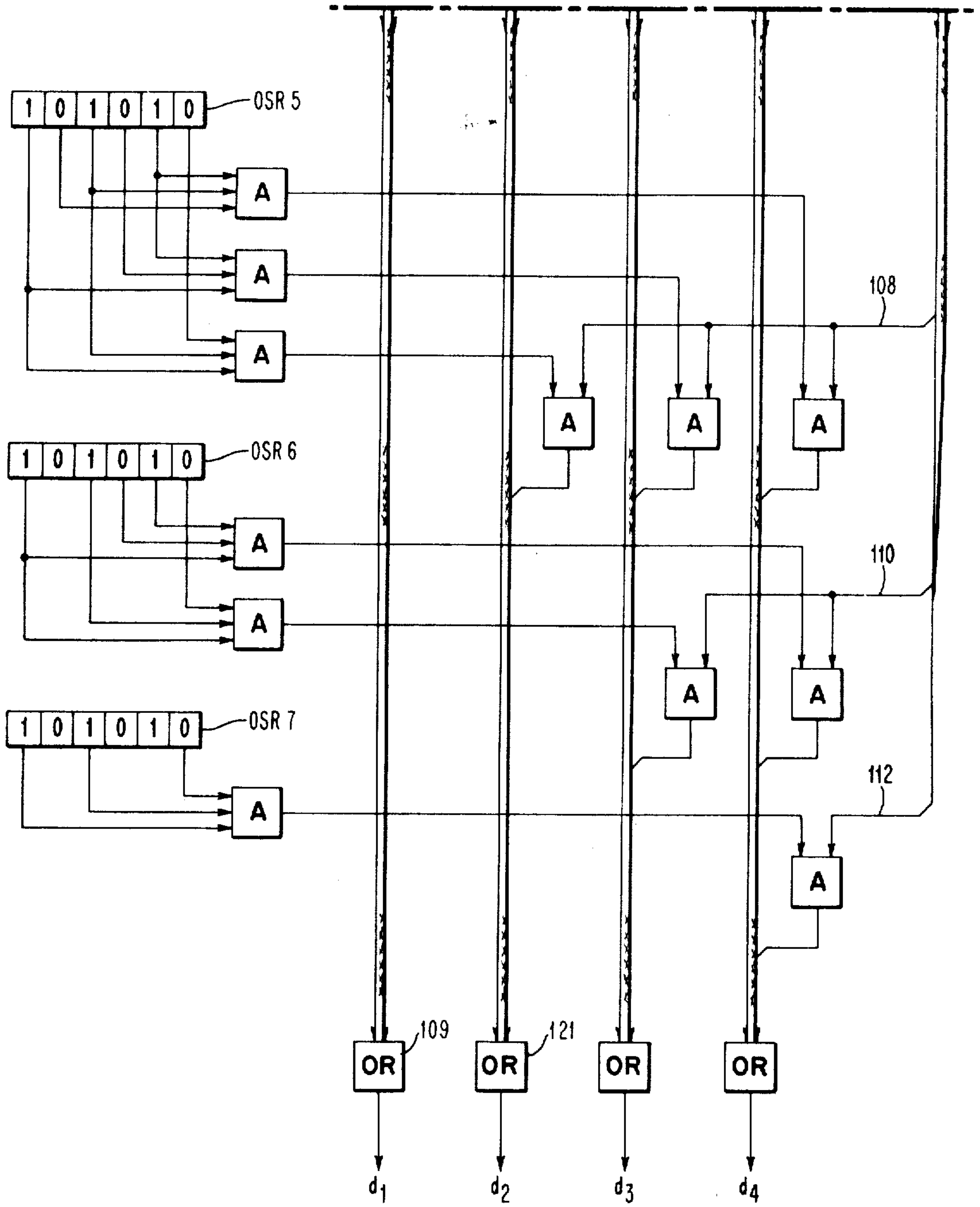

Reference is now made to FIGS. 6A–6D taken together as in FIG. 6 wherein there is shown a preferred embodiment constructed according to the invention. The embodiment is an example where the memory organization comprises seven BSM's of which BSM's 1, 2, 3 and 4 are operating modules and BSM's 5, 6 and 7 are spares. Accordingly, $q = 4$ and $s = 3$. Associated with each BSM is an input status register (ISR) and an output status register (OSR). In FIG. 6 the status registers bear the same designated number as the numeral of the BSM with which they are respectively associated. Since, in the embodiment $s = 3$, in accordance with the equation mentioned hereinabove, each of the status registers comprises three bits.

In the operation of the invention it is assumed that initially; i.e., wherein no BSM has failed, BSM's $L$ to 4 are operating and none of spare BSM's 5 to 7 have as yet been switched into this system. In this situation the status registers, ISR 1–7 and OSR 1–7 all are in the 000 state. Thus, with ISR 1 in the 000 state and the active state of line $a_1$ which is connected to bit position $b_1$, AND circuits 101 and 103 are enabled whereby line $b_1$ is activated to connect ISR 1 to BSM 1 and bit position $a_1$ to BSM 1. Similarly, with OUTPUT STATUS REGISTER OSR 1 in the 000 state and with the active state of line 100 from BSM 1, AND circuits 105 and 107 are enabled whereby BSM 1 is connected to bit position $d_1$ through an OR circuit 109. The line connects $a_1$ to bit position 1 during the read cycle and line $c_1$ to bit position 1 in the write cycle.

Continuing with the description of this arrangement, when ISR 2 is in the 000 state and line $a_2$ which is from bit position 2, is active, AND CIRCUITS 111 and 113 are enabled whereby line $b_2$ is activated by OR circuit 115 to connect BSM 2 to bit position 2. Similarly, with OSR 2 in the 000 state and, the active state of line 102 from BSM 2, AND circuits 117 and 119 are enabled to connect BSM 2 through line $d_2$ to bit position 2 through an OR circuit 121. Examination of the remainder of the arrangement shown in FIG. 6 shows that when ISR3 and OSR3 are in the 000 state, BSM 3 is connected to bit position 3, $d_3$. When status registers ISR 4 and OSR4 are in the 000 state, BSM 4 is connected to bit position 4. Let it now be assumed that BSM 2 fails. With the detection of such failure, the contents of ISR 2 is forced to an odd parity such as 111 and BSM 2 is switched out of the system.

When this event occurs the contents of register ISR 1 remain unchanged. However, the contents of registers ISR 3 to ISR 7, are switched from 000 to 011. Consequently, at this juncture, BSM 1 is still connected to bit position 1. Input status register ISR 2 has a setting such as 111; i.e., odd parity, and BSM 2 has been switched out. With the contents of ISR 3 in the 011 state and line $a_2$ active, AND circuits 123 and 125 are enabled whereby bit position 2 is now connected to BSM 3 through the OR circuit 127 and line $b_3$. Examination of FIG. 6 will show that now bit position 3 is connected to BSM 4 and bit position 4 is connected to BSM 5.

Let it now be assumed that BSM 3 fails. In this situation, the contents of ISR 1 remain at 000, the contents of ISR 3 are forced to an odd parity state such as 111. BSM 3 is switched out of the system. The contents of ISR 4 to ISR 7 are now changed to 101 and BSM 6 is switched into this system.

At this juncture bit position 1 is still connected to BSM 1 since ISR 1 is still in the 000 state. Input status registers ISR 2 and ISR 3 are in an odd parity state their contents being 111, for example. Input status register ISR 4 is in the 101 state and with the active state of line $a_2$ AND circuits 129 and 131 are enabled. Thereby bit position 2 is connected too BSM 2 through an OR circuit 133 and line $b_4$. In the same manner bit position 3 is now connected to BSM 5 and bit position 4 is now connected to BSM 6.

Let it now be assumed that BSM 5 fails. As has been mentioned, the contents of input status register ISR 5 are now forced to an odd parity state such as 111. BSM 5 is switched out of the system and the contents of ISR 6 and ISR 8 are now changed to the 110 state. In this situation, ISR 1 still retains a 000 setting whereby bit position a 1 is connected to BSM 1. Input status registers ISR 2 and ISR 3 are in the odd parity state. Input status register ISR 4 remains in the 101 state whereby bit position 2 is connected to BSM 4. Input status register ISR 5 is in the odd parity state. With ISR 6 now in the 110 state and the active state of bit $a_3$ AND circuits 135 and 137 are enabled whereby bit position 3 is connected to BSM 6 through OR circuit 139 and line $b_6$.Input status register ISR 7 is in the 110 state whereby with the active state line of $a_4$ AND circuits 141 and 143 are enabled whereby bit position 4 is connected to BSM 7. From the foregoing, it is realized that the state of each input status register follows the following state sequence during a switching operation

000 → 011 → 101 → 110

To effect the output configuration; i.e., the states of the output status registers each time that a switching of states occurs in the input status registers due to the switching out of a particular BSM, contents of output status registers are arranged as necessary to conform with the contents of the correspondingly numerically designated input status register. After such transfers, normal operation resumes. The transfer mechanism between the input status register and thE corresponding output status register is effected by conventional means.

In FIG. 6 that portion of the circuitry between the BSM and the input status registers constitutes the input reconfiguration network; i.e., the stage 12 in FIG. 1 and the network shown in FIGS. 3A–3G. The portion of the arrangement between the output status registers and the bit positions as shown in FIG. 6 constitutes the output reconfiguration network as depicted by stage 22 in FIG. 1.

As has been mentioned hereinabove, in connection with the description and operation of the arrangement shown in FIG. 1, when the diagnostic routine determines that a particular BSM has a failure, the states of the input status registers are changed to the next state as discussed above. The memory is then refurbished by reading out all of the words contained therein through the output reconfiguration network under the control of the output status register (the states of the OSR's have not been yet changed to conform with those of the input status registers). The words so read out under the control of the output status registers is passed through a corrector wherein the words are subjected to group error correction. The corrected words are then loaded back into the memory through the input reconfiguration network under the control of the input status registers. After this has been achieved, then the contents of the output status registers are brought into conformity with their corresponding input status registers to effect the final output connection reconfiguration before normal operation resumes.

In the description mentioned thus far and the embodiment shown in FIG. 6, there is the underlying assumption that the BSM to be switched off is known or given. However, in actual practice the only information available is as to which of the data positions $d_k$ has undergone correction most frequently over a fixed period of time.

Figures 7, 7A:
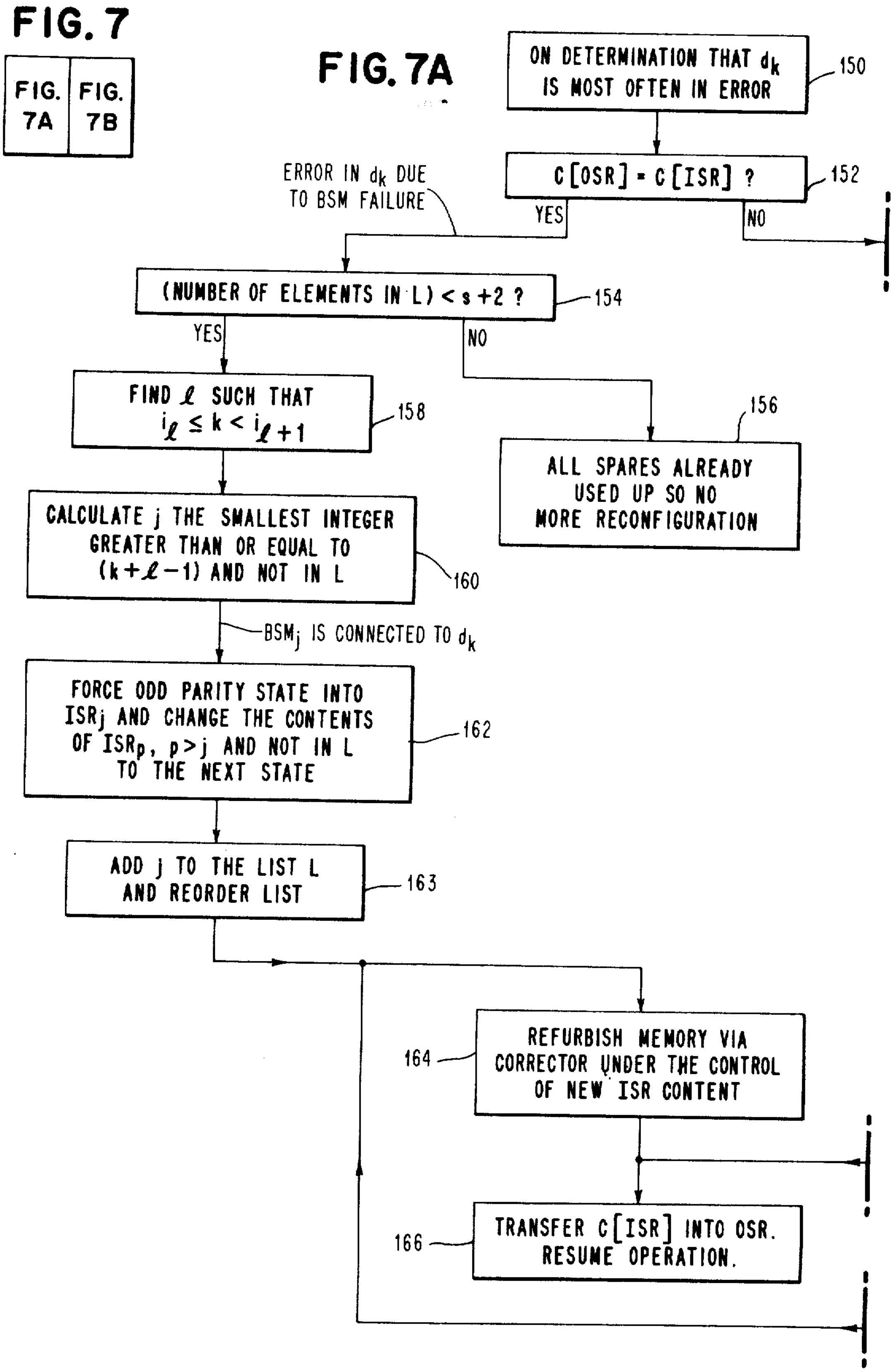
FIGS. 7A and 7B taken together as in FIG. 7 is a flowchart of an algorithm for selecting a failed BSM to be switched out, utilizing as the criterion for failure, the bit position which has undergone correction most frequently over a chosen period of time.
Figure 7B:
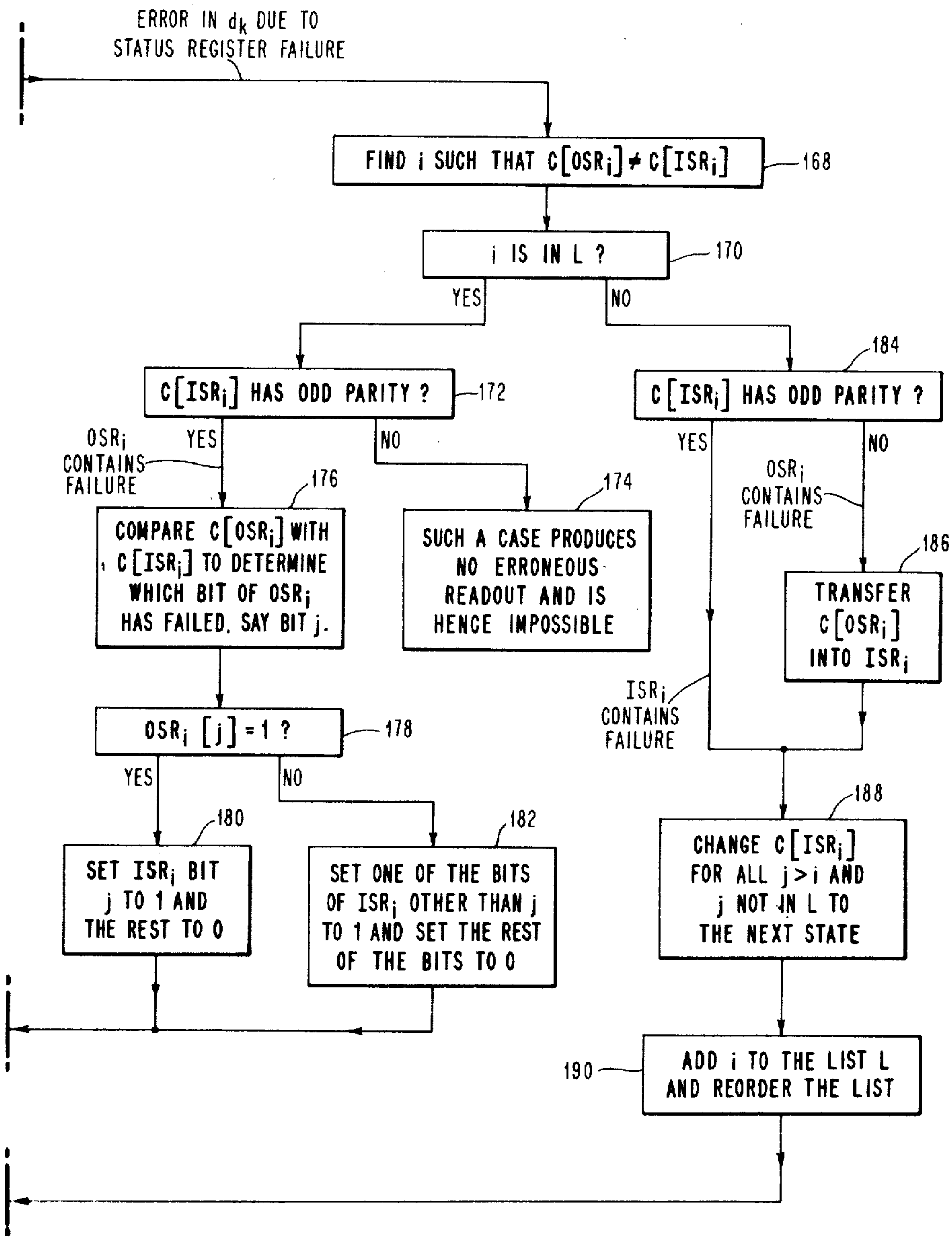

In FIG. 7A and 7B, taken together as a FIG. 7, there is depicted a flow chart of an algorithm for determining the BSM which is to be switched off from a given data position $d_k$; i.e., the position which has undergone the most frequent correction in a particular time period. In FIG. 7 the term $L$ is an ordered list of failed BSM's. The term $L = (i_1, i_2, \ldots i_{L-1}, iL)$ where $i_1 = 0$, $i_L = q + s + 1$ and $i_2, i_3, \ldots i_L$ is an ordered list of the failed BSM's. Initially, $L = (0, q + s + 1)$ wherein $q$ is the quantity of operating BSM's and s is the quantity of spare BSM's. The term OSR is the output status register, the term ISR is the input status register, the term $OSR_i$ is the set of flip-flops of OUTPUT STATUS REGISTER associated with the ith BSM. By the term OSR there is meant all of the output status registers. The term $OSR_i$ [$j$] corresponds to the $j$th flip-flop of the set OSR $i$. The term C [register] means the contents of the register.

Referring now to FIG. 7, block 150 indicates the determination that a given bit position $d_k$ is the most often in error. In step 152 the test is made as to whether the contents of the output status registers are the same as the contents of the input status registers. If they are then, of course, this indicates that the errors in bit position $d_k$ are due to a BSM failure. In such case the program moves to step 154. In step 154 a test is made as to whether $s + 2$ exceeds or equals the number of BSM's in the failed list $L$. Taking the example of FIG. 6 where $s$ was taken to be equal to 3, if the number of BSM's in the failed BSM list exceeds or equals 5, the program moves to step 156 which indicates that all of the spare BSM's have already been switched into the system. Thereby no further reconfiguration is possible. However, if step 154 results in a yes; i.e., the quantity $s + 2$ exceeds the number of failed BSM's in list $L$ the program moves to step 158 wherein $l$ is found such that $i_l$ is less than or equal to $k$, and $i_{l+1}$ is greater than $k$. To understand the operation of step 154, let is be assumed that $d_k$ is bit portion 3 whereby $k = 3$. Let it be further assumed that at this juncture there have been no failed BSM's as yet. Thereby the list $L$ is at its initial state; i.e., it contains 0 and $q + s + 1 = 8$. Consequently, the failed BSM will be entered into the list as $i_1$ thereby $l = 1$. In step 160 there is now calculated the term $j$ which is the smallest integer greater than or equal to $(k + l - 1)$ and not in list $L$. Using the example where $k = 3$ and where $l = 1$, it is seen that $j = 3$, whereby it is ascertained that, for example, $BSM_3$ is connected to bit portion 3 .

Now by step 162 an odd parity state is forced into input status register $ISR_j$. The contents of the input status registers $ISR_p$ wherein p is greater than $j$ are switched to the next state as explained hereinabove. Of course all input status registers associated with BSM's in the failed BSM list $L$ will not have their contents changed by step 162 as they are in an odd parity state. By step 163, $j$ is added to the list $L$ in the example wherein this is the first BSM to fail, $j$ becomes $i_2$ in list $L$. By step 164 all of the data stored in the BSM's is emptied out of the BSM's and passed through the corrector through the output reconfigurationnetwork under the control of the output status registers. From the corrector they are returned to the memory through the input reconfiguration network under the control of the input status registers to the BSM's. There now remains step 166 wherein the contents of the output status registers are brought into conformity with the contents of the input status registers as the latter had been switched into by step 162. Thereafter normal operation can be resumed. By step 166 switching in the spare BSM's is done.

Referring back to step 152, let it be assumed that step 152 had resulted in a No. This would indicate that the error in bit position $d_k$ would be due to a status register failure. In such case, by step 168, there is ascertained the value of i, i.e., that BSM $i$ whose input and output status registers do not have equal contents. By step 170 the test is made as to whether $i$ as determined by step 168 is in the failed BSM list $L$. If step 170 results in a Yes, then the program moves to step 172 wherein the test is made as to whether the input status register ISR $i$ has odd parity. If step 172 results in a No, then as set forth in block 174, such a case can produce no erroneous readout and, accordingly, is impossible. If step 172 results in a yes, clearly, output status register $OSR_i$ contains the failure. Thereby, by step 176 there are compared the contents of input status register $ISR_i$ with output status register $OSR_i$ to determine which bit of the latter output status register has failed, the failed bit being designated as j. The program then moves to step 178.

In step 178, the test is made as to whether bit $j$ in output status register $OSR_i$ is equal to 1. If it is thenby step 180 bit $j$ in input status register $ISR_i$ is set to 1 and the rest of the bits $ISR_i$ to 0. From step 180, the program again moves to step 166 wherein, the contents of the output status registers are brought into conformity with the corresponding respective input status registers.

If step 178 were to result in a No, then one of the bits other than bit $j$ in the input status register $ISR_i$ are set to 1 and the rest of the bits of input status register $ISR_i$ are set to 0, this operation being performed by step 182. After the completion of step 182 the program again moves to step 166.

Referring back to step 170, if this step had ressulted in a No; i.e., i is not in fail list $L$, the program moves to step 184 wherein the check is made as to whether the contents of input status register $ISR_i$ has odd parity. If it does, and since $BSM_i$ is not in list $L$, it is indicated that input status register $ISR_i$ contains the failure. However, if step 184 results in a No, this indicates an OSR $i$ failure and the contents of input status register $ISR_i$ are brought into conformity with the contents of output status register $OSR_i$ by step 186. Thereafter, by step 188 the contents of all input status registers $ISR_j$ wherein $j$ is greater than $i$ and any of $j$ are not in list $L$ to the next state. In step 190 there is performed the operation of adding $i$ to list $L$ and reordering of list $L$. The program then moves to step 164 and thereafter 166 to effect resumption of operation.

It is thus seen that with the above described invention there is provided a system that can tolerate in the worst case a total number of BSM and status register failures equal to the number of spare BSM's. As has been mentioned above, this situation obtains because in the worst case a status register failure appears as a BSM failure and the subsequent switching off of the BSM associated with the failed status register switches off the status register containing the failure. Also, since the status registers control the entire switching network, the capability of tolerating status register failures greatly enhances the reliability of the BSM reconfiguration.

Figure 8:
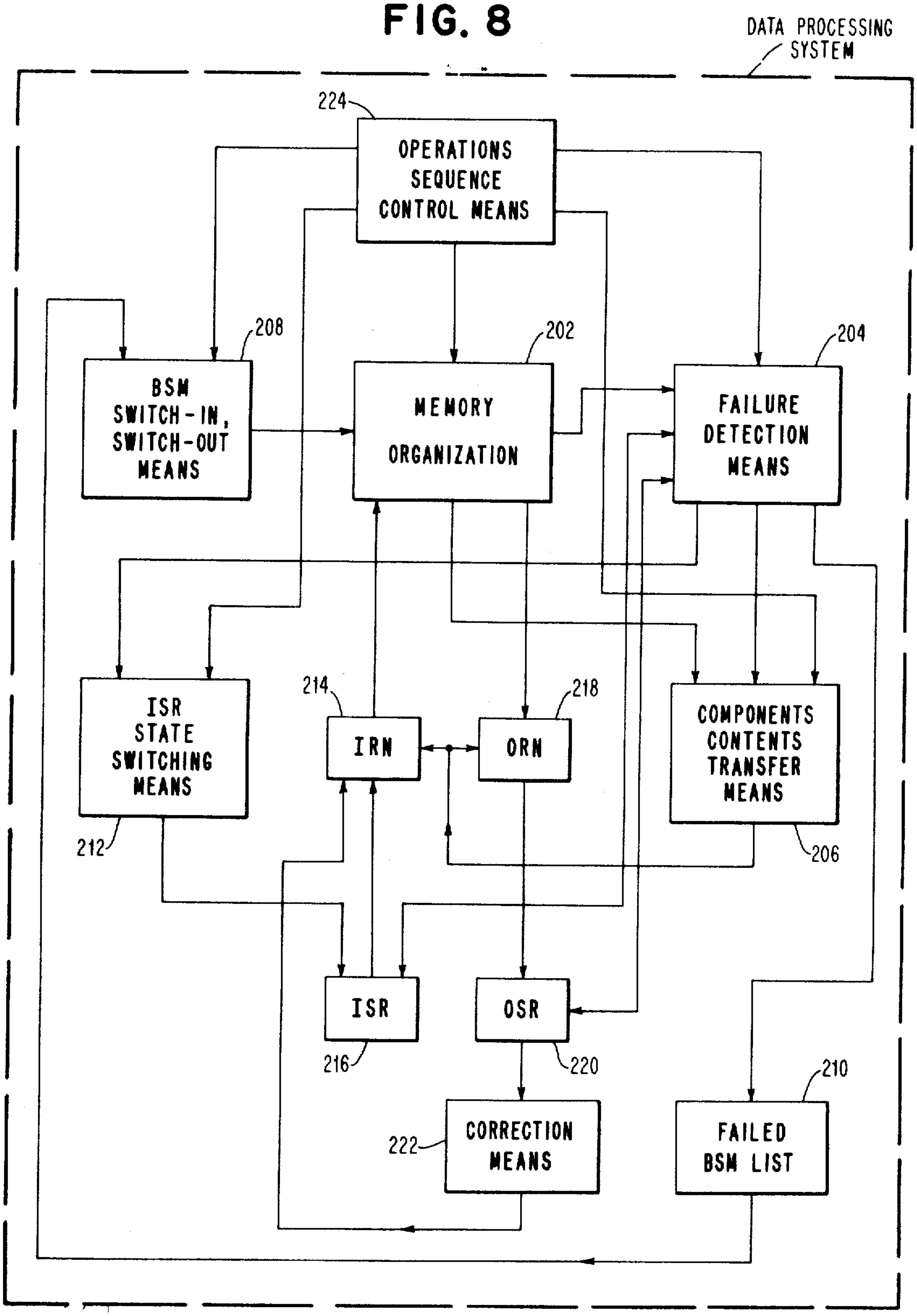
FIG. 8 is a diagram of a data processing system wherein the invention is effectively employed.

It is understood that the invention described hereinabove is utilized in a data processing system. In FIG. 8, there is shown a block diagram of a data processing system 200 wherein the invention is suitably employed.

Referring to FIG. 8, the memory organization 202 is of the 8+$s$ BSM's organization as described hereinabove. Stage 204 is the means in system 200 which detects failures such as BSM and status register failures. Stage 206 is the means in data processing system 200 which effects transfers between systems such as ISRs and OSRs. Stage 208 effects the switching in and switching out of BSM's. Stage 210 is the failed BSM list. Stage 212 is the means for switching ISR's to successive states. Stages 214 and 216 are the input reconfiguration network and input status registers respectively. Stages 218 and 220 are the output reconfiguration network and output status registers respectively. Stage 222 is the correction means and stage 224 represents the clocks for controlling operations sequence in system 200.

While the invention has been particularly shown and described with reference to preferred embodiments thereof, it will be understood by those skilled in the art that the foregoing and other changes in form and details may be made therein without departing from the spirit and scope of the invention.

We claim:

1. In a data processing system which comprises information containing components, means for transferring contents between said components, means for changing the contents of said components, means for controlling the sequence of operations in said system, a memory organization comprising a quantity $q$ of operating basic storage modules and a quantity $s$ of spare basic storage modules, and means for detecting failures in said components and said memory organization, a control apparatus for said memory organization comprising:

input status register means comprising a quantity $q+s$ of input status registers, each of said input status registers being capable of assuming at least $s+1$ successively occurring states in said predetermined sequence in a chosen normally operating parity, and a parity state opposite to said chosen parity;

an input reconfiguration network;

means for associating each of said input status registers with a respective one of said basic storage modules;

output status register means comprising a quantity $q+s$ of output status registers, each of said output status registers being capable of assuming at least said $s+1$ successively occurring states in a chosen normally operating parity, and a parity state opposite to said chosen parity;

an output reconfiguration network;

means for associating each of said output status registers with a respective one of said basic storage modules;

said input and output status registers associated respectively with each of said $q+s$ quantity of basic storage modules initially being in a first of said successive states in said chosen parity;

means for connecting said operating basic storage modules to respective bit positions through said reconfiguration networks;

correction means for receiving the contents of said basic storage modules through said output reconfiguration network under the control of said output status register means; and means for providing the output of said correction means to said basic storage modules through said input reconfiguration network under the control of said input status register means;

whereby, upon the detection by said failure detection means of a failure in one of said basic storage modules or in one of said status registers, the failed basic storage module or the basic storage module associated with the failed status register is caused to be switched out as an operating basic storage module, a spare basic storage module is switched in, the states of the input status registers associated with the remaining operating modules of a higher order than the failed basic storage module and said remaining spare basic storage modules are changed to the next state, of said predetermind state sequence, the contents of said basic storage modules are passed through said correction means and back into said basic storage modules, and contents of said output status registers are conformed with the contents of said input status registers, thereby enabling the resumption of normal operation by said memory organization, said organization being capable of operating with up to a total of s basic storage module and status register failures.

2. In a data processing system as defined in claim 1 wherein:

upon the detection of a failed BSM, the input status register associated with said failed BSM is changed to said parity state opposite to said chosen parity prior to the passing of the contents of said basic storage modules through said correction means and back into said basic storage modules.

3. In a data processing system as defined in claim 1 wherein said basic storage modules and the status registers associated therewith are designated in ordered numerical value and wherein status registers of a particular numerical designation are associated with the basic storage module having the same numerical designation; and further including an ordered list of failed basic storage modules for including therein the information of a switched out and unavailable basic storage module, whereby, upon the switching out of an operating basic storage module, a spare basic storage module is switched into operation, and said basic storage module bit positions connections are reconfigured in accordance with said reconfiguration networks.

4. In a data processing system as defined in claim 3 wherein said operating basic storage modules and the status registers associated therewith have corresponding first to qth numerically ordered designations, wherein said spare basic storage modules and the status registers associated therewith have ($q$th + first) to ($q$ + $s$th) numerically ordered designations, hwerein said first to $q$th basic storage modules are connected to correspondingly numerically ordered bit positions, wherein said successively occurring states occurring in said chosen parity are numerically ordered from first to $(s+1)$th, wherein initially said status registers associated with all of said $q+s$ basic storage modules assume the first of said successively occurring states, whereby, upon the switching out of a basic storage module, there is switched in the next available spare basic storage module according to said order and the states of the status registers associated with the remaining operating basic storage modules whose numerical designations follow the numerical designation of said switched-out basic storage module in said order and said remaining spare basic storage modules are changed to the next state in said predetermined state sequence.

5. A system for effecting storage module reconfiguration in the memory of a data processing system wherein said memory comprises a quantity q of operating n-bit BSM's and a quantity $s$ of spare n-bit BSM's, said system comprising:

input status register means comprising a $q+s$ quantity of input status registers, each of said input status registers being capable of successively assuming first to $(s+1)$th states and of a chosen parity and of assuming a parity opposite to said chosen parity;

output status register means comprising a $q+s$ quantity of output status registers, each of said output status registers being capable of successively assuming a first to $(s+1)$th states and of said chosen parity, and of assuming said parity opposite to said chosen parity;

an input reconfiguration network;

means for correcting said operating BSM's to respective numerically ordered bit positions through said input and output configuration networks, respectively;

means for associating each of said input status registers, with each of said BSM's respectively, said input status registers associated with said $q+s$ BSM's initially being in said first of said successive states;

means for associating each of said output status registers with each of said BSM's respectively, said output status registers associated with said q + s BSM's initially being in said first of said successive states, BSM and status register failure response means respnsive to the ascertaining that one of said BSM's of status register has failed, comprising:

means for switching the state of the input status register associated with a failed BSM to said opposite parity state;

means for switching out failed BSM or a BSM associated with a failed status register;

means for switching the state of the input status registers associated with the remaining operating BSM's which are connected to bit positions of numerical value further in said order than the values of the bit positions to which the switched-out BSM was connected and the remaining spare BSM's to the next of said successive states, and means for connecting a spare BSM into the system, in response to the switching-out of an operating BSM ;

error correction means;

means for applying the contents of the BSM's through said output configuration network under the control of said output status registers to said error correction means to correct said contents;

means for providing said corrected contents to said BSM's through said input reconfiguration network under the control of said input status registers; and means for respectively conforming the contents of said output status registers with the contents of said input status registers to enable the resumption of normal operation, the operation of said BSM failure responsive means causing the switching out of each successively occurring failed BSM or BSM associated with a failed status register as each failure is detected, the addition of the appropriate spare BSM completing the set of operating BSM's until no more spare BSM's remain, and the concomitant successive appropriate switching of the states of said status registers.

6. A system as defined in claim 5 wherein said input and output status registers are of equal bit length, wherein each input status register corresponds to one of said output status registers, each of said last-named registers being associated with the same BSM and wherein each of said input and output status registers has a length of $1+\lceil \log_2 (s+1) \rceil$ bits.

7. A system as defined in claim 6 wherein said BSM's said input registers and said output registers are ordered by numerical value, said input and output status registers being associated with BSM's of the same numerical value, respectively, and wherein there is further included;

an ordered list of said failed BSM's.

8. A system as defined in claim 7 wherein said BSM failure response means further includes means responsive to said failed BSM list for ascertaining the next spare BSM available to be switched in as an operating BSM.

9. A system as defined in claim 8 wherein the contents of the registers of said operating and available spare BSM's are in an even parity state and wherein the contents of the status registers associated with failed BSM's are in an odd parity state.

* * * * *